Sept. 10, 1946.   M. H. MANN   2,407,433
TYPEWRITING MACHINE
Filed Dec. 13, 1944   6 Sheets-Sheet 1

INVENTOR
Miles H. Mann
BY
ATTORNEY

Sept. 10, 1946.　　　M. H. MANN　　　2,407,433

TYPEWRITING MACHINE

Filed Dec. 13, 1944　　　6 Sheets-Sheet 3

Fig. 4

INVENTOR
Miles H. Mann
BY
ATTORNEY

Sept. 10, 1946.        M. H. MANN         2,407,433
TYPEWRITING MACHINE
Filed Dec. 13, 1944        6 Sheets-Sheet 5

INVENTOR
Miles H. Mann
BY
ATTORNEY

Sept. 10, 1946. M. H. MANN 2,407,433
TYPEWRITING MACHINE
Filed Dec. 13, 1944 6 Sheets-Sheet 6

INVENTOR
Miles H. Mann
BY
ATTORNEY

Patented Sept. 10, 1946

2,407,433

UNITED STATES PATENT OFFICE 2,407,433

TYPEWRITING MACHINE

Miles H. Mann, Miami, Fla., assignor to Underwood Corporation, a corporation of Delaware Application December 13, 1944, Serial No. 567,999

20 Claims. (Cl. 197—127)

This invention relates to typewriting, accounting, billing, and related machines, and more particularly to devices for such machines which facilitate manipulation or presentation of work sheets, for example statement and record sheets, into entry receiving positions. Devices of this kind commonly take the form of front-feed devices which require to be conditioned or operated to facilitate convenient presentation of the work sheets to the machine. In some instances a printing platen is displaceably mounted to facilitate manipulation or presentation of the paper.

Most commonly in machines to which the invention pertains a statement sheet and a record sheet are presentable thereto, the latter behind the statement sheet with a transfer sheet overlying it. Usually a new statement sheet is sent out monthly to the customer and the record sheet is retained and receives entries which are the aggregate of the entries on several monthly statements. A record sheet thus constitutes a long-term record of the business transacted with a particular customer. Both sheets, the record sheet, as well as the statement sheet, are presented to the machine from time to time, and in properly collated position thereon, to receive new entries uniformly and definitely spaced from previous entries.

A usual procedure in posting entries is to present first the record sheet to the machine in a position so that the next line-entry will come a proper predetermined distance below the previously made entry. Then the statement sheet is front-fed so that the next line-entry to be made thereon will come also the proper distance below the previously typed entry. One or more lines are then posted, depending on how many business transactions there have been under a certain date. If there are several entries under the same date, the proof balance is only entered as of the end of the day, wherefor in using certain conventional forms of bookkeeping an entry in the last, that is the rightmost column, is only called for in connection with a line-entry which is to be followed by the removal of the statement sheet and usually also the record sheet. Therefore, the common routine called for is that following the last entry in the rightmost column, the record sheet and the statement sheet are removed and that the carriage, in preparation for the next posting operation, is returned.

It is one object of the invention to take advantage of the above condition, and to provide efficient and reliably operative means whereby if and when a line-entry terminates at the rightmost column, a subsequent return of the carriage will cause the front-feed mechanism to be conditioned for front feeding, the return of the carriage being preferably by power and automatically instituted in consequence of the entry made in said rightmost column.

Another, more general object of the invention, is to provide efficient facilities for presentation or manipulation of work material in machines of the class to which the invention relates.

A further object of the invention is to provide in combination with a plurality of carriage return instituting controls, means whereby the machine will be conditioned for sheet manuipulation or sheet introduction whenever a specific one of these carriage return controls is actuated.

Also an object of the invention is to provide simple and efficient means whereby the device by which sheet manipulation is facilitated may be caused to remain in an ineffective condition at the will of the operator.

Furthermore, it is an object of the invention to provide efficient and simple means which enable the operator to position conveniently and accurately the work sheets or sheet relative to a previously made entry for the next line-entry or, if desired, in a previous writing position for a corrective entry.

An adjunct object in connection with the means for attaining the last mentioned object is to construct such means in a manner to facilitate rearward deflection of rear-inserted (record) sheets, as such sheet emerges upwardly at the front of a work sheet backing platen.

Other objects will in part be obvious and in part pointed out particularly as the following description of a preferred embodiment of the invention proceeds, such embodiment being illustrated in association with an Underwood standard typewriter.

Figures 1, 2:
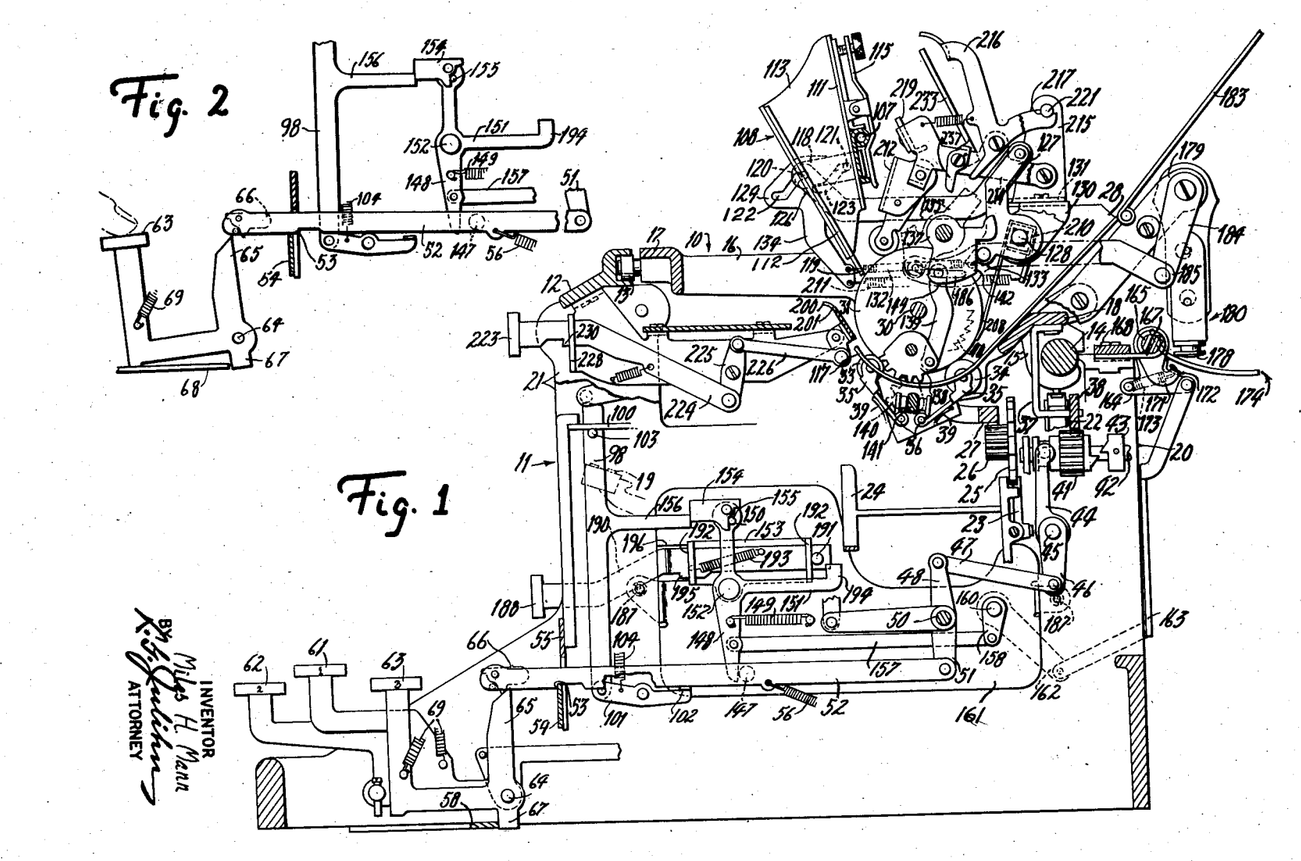
Figure 1 is a side elevation of a typewriting machine embodying the invention, certain parts of a work sheet supporting carriage and of a main frame having been broken away for clearness of illustration.
Figure 2 shows, in side elevation, a carriage return tripping mechanism, tripped by depression of a carriage return key, and additionally shows a portion of a front-feed device operating control, blocked against operation.

Directing attention now more particularly to Figure 1, a carriage, generally designated by the reference numeral 10 is movably supported upon a stationary frame 11. The frame for this purpose is equipped at the front with a grooved rail 12 wherein the carriage is guided by means of anti-friction rollers 13, and at the rear the frame is equipped with a rail 14 along which the carriage is guided by means of spaced members 15 which partially embrace said rod. The carriage 10 comprises an open, rectangular cast iron frame 16 having a front bar 17 and a rear bar 18, several of said rollers 13 being supported on said front bar 17 and said members 15 being fast on the underside of the rear bar 18. For supporting the rear carriage rail 14 the main frame 11 has integral therewith a plurality of supports or standards 20 at the rear of the machine; and for supporting the front rail 12 the frame has two oppositely spreading horns 21 extending upwardly, see particularly Figure 4.

As is usual in typewriting machines, the carriage is spring-urged in letter-feed direction, from right to left, by a carriage feed band under the influence of a spring drum 22. However, the feed of the carriage is controlled by a letter feed escapement 23 which upon each actuation of a universal bar 24 by one of a set of type members 19 permits a stepwise movement of an escapement wheel 25, the latter of which, by means of a pinion 26 and a carriage-supported feed-rack 27, governs the movement of the carriage.

Carried on the cast iron frame 16 of the carriage is an inner frame which comprises at each end of the carriage an end piece 28. In these end pieces there is rotatively supported by means of a platen shaft 30 a platen roller 31, said platen shaft 30 having at each end externally of the end piece 28 a platen rotating knob 32, see Figures 3 and 5.

Associated with the bottom of the platen there are a series of front feed rolls 33 and a series of rear feed rolls 34, each of these feed rolls being pivotally supported upon an individual fixture 35 and said fixtures are hingedly carried upon pivot rods 36. Springs 39 tend to constantly influence said fixtures 35 to press said feed rolls 33 and 34 into paper feeding association with the platen 31.

*Power return mechanism for carriage*

The machine of the invention may embody the power return mechanism disclosed in the aforesaid patent to Pitman No. 2,306,564, and such portions of said return mechanism which are deemed more particularly helpful for an understanding of the invention are illustrated and will be described forthwith, it being understood that reference to said patent may also be had.

The carriage 10 has supported for limited sliding movement, lengthwise and rightwardly of the carriage, on brackets 37, a carriage return rack 38. This rack is slidable on the carriage against the tension of a spring, not shown, and is operatively connected to a line-spacing mechanism for the platen 31, in a manner well known, and so that an initial movement of the rack in the return direction of the carriage will operate said line-spacing mechanism, the latter acting upon a ratchet wheel which is fixed on the platen shaft 30 and which is indicated in Figure 1 by the reference numeral 40.

A carriage return pinion 41 is in constant mesh with the rack 38 and is slidable transversely of the rack along a constantly motor-driven drive-shaft 42 for movement into toothed engagement with a toothed clutch collar 43 constantly revolving with the drive-shaft 42. The pinion is normally held in the forwardly shifted position seen in Figure 1, by means of a shifter arm 44 engaging by means of a pin thereon, a circumferential groove on the pinion 41. The pinion 41, in the normal position seen in Figure 1, permits free movement of the carriage. The shifter 44 is fast upon a rock shaft 45 which has a pendant arm 46, connected by a link 47 with an arm 48 fast on another rock shaft 50. Also fast on the rock shaft 50 is a pendant arm 51 which has articulated thereto and reaching forwardly therefrom a trip link 52 having a holding or latch shoulder 53 normally engaging a keeper 54 on a key-lever comb plate 55 of the machine. A spring 56 is so attached and acting on the link 52 to keep the latch shoulder 53 normally down in front of the keeper 54, but to draw said link rearwardly if the forward end of the link is given an upward displacement to free the shoulder 53 from the keeper 54. With the shoulder 53 engaging the keeper 54, the clutch shifter 44, as seen in Figure 1, is in open clutch position; but when the forward end of the link 52 is lifted, as in Figures 2 and 6, the resulting rearward displacement of the link by the spring 56 will cause the shifter 44 to move the pinion 41 into clutched engagement with the clutch collar 43, the pinion 41 becoming then motor driven and being then effective through said rack 38 to actuate first the line spacing mechanism and then to draw the carriage in return direction.

The typewriter embodies at the gront thereof a keyboard which includes a plurality of carriage return keys numbered 61, 62, 63. Said keys are rockable individually about a common fulcrum-stud 64 provided upon the frame work of the machine. Each of said carriage return keys has an upwardly pointed trip arm 65 to engage, upon actuation of the key, a cam face on the underside of a oneway pawl 66 pivotally carried on the trip link 52, thereby to lift the trip link 52 for a resulting clutch closing, carriage return instituting, rearward movement by the spring 56. The normal position of the several carriage return keys is determined by pendant noses 67 abutting a rear edge of a frame plate 68 under the tension of key returning springs 69.

The several carriage return keys 61, 62, 63 are provided for the purpose of instituting returns of the carriage selectively to a number of different positions, the key 61 being for returning the carriage to the leftmost one of three return positions and the keys 62 and 63 being provided to return the carriage to respectively more rightward marginal positions.

For terminating the carriage returns at the said different positions there is mounted between the horns 21 of the main frame 11 a rack 70 supporting three carriage return terminating margin stops; one numbered 73, under control of which the carriage return will be terminated if the carriage return has been initiated under the control of the key 63; another stop 72 which will terminate carriage returns which are called into operation by a depression of the carriage return key 62; and still another carriage return stop, not shown, which terminates such returns as are called into operation by the return key 61. The stops 71, 72, 73 are individually settable along the rack to desired carriage return terminating position. Also adjustably supported on the rack is a line-end margin-stop 75, the purpose of which will be set forth later. The rack 70 is supported between the frame-horns 21 with capacity for some lengthwise displacement to the right, as well as for certain pivotal movement. To this end, the rack 70 carries at the right extremity, projecting resiliently from within above therefrom, a pin 76 which fits pivotally into a socket 77 provided on the right-hand frame-horn 21. At the left end, the rack 70 is mounted to pivot unitarily with an arm 78 about the axis of a stud 80, and is given capacity for endwise movement toward the right. In the normal position, see Figure 4, the rack is lengthwise displaceable to the right, and is pivotally so positioned that a margin counterstop tongue 81 on the front bar 17 of the carriage is in carriage return terminating range with an edge 82 on the extreme carriage return stop 73, and that another tongue 83 on the carriage is free to pass the carriage return stop 72 and also the short-return controlling stop which it has been stated is not shown. When a carriage return is instituted under the control of the key 63, the carriage is driven rightwardly until the tongue 81 thereon engages the edge 82 of the margin stop 73, whence the margin stop and the rack are displaced against resilient resistance, rightwardly, a short distance to open the carriage return drive and to restore the trip link 52, in a manner later to be described. Operation of the keys 61, 62, give the rack differential pivotal movements, respectively to bring the associate return stop, that is the short-return stop and the intermediate return stop 72, into stopping range with the counterstop tongue 83. This is done by a mechanism not shown, but clearly disclosed in said patent to Pitman. As in the case of the return to the extreme position, the margin stop rack 70 receives, via the engaged margin stop, a rightward, clutch opening displacement.

The mechanism by which the power drive is interrupted at the end of each return will now be described. Paralleling the margin stop rack 70 near the right end, slightly to the rear, is a slide bar 85 which has a plate 86 presenting, in abutting relation, an ear to the right end of the margin stop rack 70. The bar 85 is slid a short distance to the right from the position seen in Figure 4, by the margin stop rack, as a result of the carriage return terminating displacement thereof, and is at its left articulated to an arm 87 fast upon a shaft 88 extending fore and aft of the machine and pivotally carried thereon, said shaft having at its rear a horizontal arm 90. Motion is transmitted from said arm 90 to the shaft 50 of the carriage return controlling mechanism, by means of a vertical link 91 connected with an arm 92 fast on the shaft 50. At the end of each carriage return, when either the tongue 81 or the tongue 83 engages a carriage return stop, the resulting rightward displacement of the rack 70 results in transmittal of motion over the parts 86, 85, 87, 88, 90, 91 and 92 to the shaft 50 to disengage the carriage return pinion 41 from the clutch collar 43 and to relatch the trip link 52 in normal, open clutch position.

Mention has hereinbefore been made of a line-end margin-stop 75. This stop functions to institute a power-driven carriage return automatically as the carriage advances far enough to the left for the tongue 81 to engage a cam edge 93 on the stop. When this happens, the tongue 81, by means of a cam face on the left side thereon acts upon the cam edge 93 of the line-end margin-stop and causes the latter, together with the rack, to receive temporarily a pivotal downward displacement about the axis constituted by the stud 80 and the pin 76. This pivotal displacement is transmitted to the aforesaid arm 78 via a pin-and-fork connection to an arm 94 on a shaft 96 which also has an arm 95, said shaft 96 being pivoted upon the frame work of the machine. A pin 97 on the arm 95 normally is in overlying contact with a vertically movable member 98 which near its top is guided in a perforation of a frame plate 100 and which has at its bottom a pivotal connection with a lever 101 presenting an operating tab 102 in underlying relation to the trip link 52. Said vertically movable member 98 has a pin 103 projecting therefrom and abutting normally the under side of the guide plate 100 under the tension of a spring 104 attached to the lever 101. The normal pivotal position of the stop rack 70 is governed by the pin 97 contacting the member 98 in its normal position.

It will now be seen that if in the course of typing, or otherwise, the carriage advances far enough for the tongue 81 thereon to engage and depress the line-end margin-stop 75, the just-described mechanism train to the lever tab 102 will be actuated, and will result in the lifting of the trip link 52 by the tab 102, and consequently the freeing of the latch shoulder 53 from the keeper 54. Thus the trip link 52 will be drawn rearwardly by the spring 56 to closed clutch position. There will then ensue a power return of the carriage which will eventually be terminated by the engagement of the carriage tongue 81 with the extreme return limiting margin stop 73, it being noted in this connection that immediately after the initial return motion of the carriage has separated the tongue 81 from the margin stop 75, the rack 70 will be enabled to assume its normal pivotal position under the tension of the aforesaid spring 104.

*Front feed device*

Figure 3:
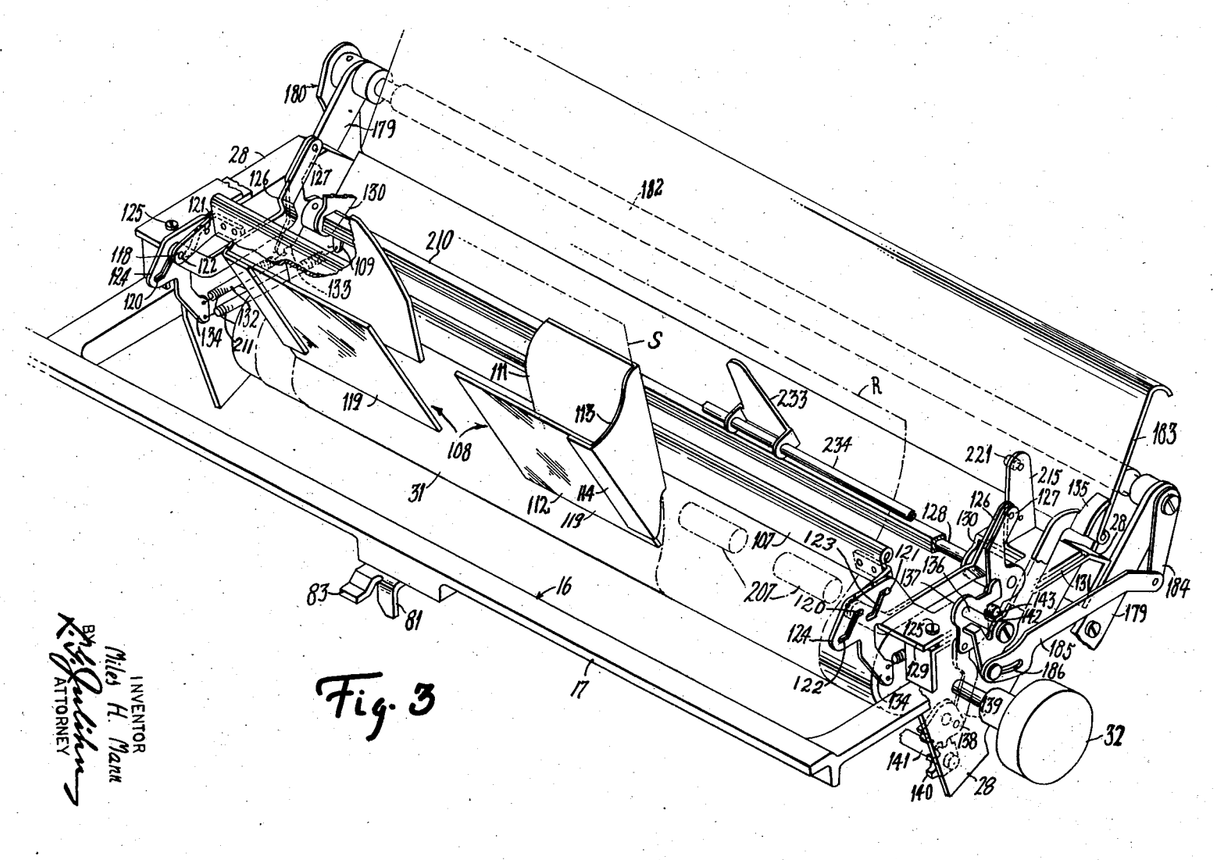
Figure 3 is a perspective view of a typewriting machine carriage showing parts of a front-feed device in normal position.

Supported upon a bar 107 extending parallel to the carriage is a front-feed chute comprising two spaced units consisting each of a rear plate 111, a front plate or panel 112 and a side web 113 connecting said plates. The rear plate 111 and side web 113 of both these units are preferably struck up from sheet metal and the side webs 113 have flanges 114 bent toward each other, whereto the front plates 112 are secured by rivets or otherwise, the front panels of both said chute sections or units being preferably made of transparent, stiff material of the Celluloid varity. The opposite sections of the chute are individually securable in different positions along the bar 107 by means of clamps 115, thereby to accommodate different width work sheets, such as the statement sheet designated by the letter "S," between the side webs 113 and in proper lateral location relative to another sheet, such as a record sheet designated by the letter "R." The composite chute is normally so positioned that lower edges 119 of the front panels 112 thereof will bend the inserted statement sheet "S" upwardly and rearwardly, snugly around the platen for an appreciable distance above the printing line at the extreme front of the platen, see Fig 3. In order to facilitate front-feeding of statement sheets "S" from time to time, the chute is movable forwardly from the position seen in Figures 1 and 3, to the position seen in Fgures 5 and 6, in the latter position of which, as seen in Figure 6, the statement sheet can be chuted downwardly and rearwardly between the platen 31 and the said paper apron 117. To facilitate forward movement of the chute as required, the chute supporting bar 107 has fixed thereto at each end, extending forwardly therefrom, a branch 118, said branches having each a front guide pin 120 and a rear guide pin 121 reaching laterally and respectively into front and rear guide slots 122, 123 provided in vertically disposed plates 124. Each of said plates is bent from and is part of a bracket 129 secured, as by screws 125, upon the adjacent end piece 28 of the carriage. Pivotally connected to the bar-branch 118, at each end of the carriage, by being linked to the associate pins 120 between the branch 118 and the neighboring plate 124, there are opposite, rearwardly extending operating links 126. At the rear, both these links 126 are pivotally connected to associate arms 127 which are fastened to and upwardly reaching from a rock shaft 128, see particularly Figures 1 and 3. The arms 127 and the rock shaft 128 constitute a rockable bail, which, as may be best seen from Figures 1 and 3, is pivotally supported between the carriage ends 28 by bracket ears 130 bent vertically down from horizontal plates 131 underlying the brackets 129 and secured to the opposite carriage ends 28 by the same screws 125 which secure also the brackets 129. It will now be noted that when said bail is turned anticlockwise, as considered with reference to Figure 1, the chute supporting bar 107, together with its chute, will be given substantially a forward motion of translation under the guiding influence of the slots 122, 123. The rear ends of the slots 122, 123, in conjunction with the pins therein, determine the normal, that is the rearward position of the chute 108, and springs 132, attached to downward reaches 133 of the arms 127, and anchored to fingers 134 of the plates 124 influence the bail 127, 128 to hold the chute normally in the rearward position as seen in Figures 1 and 3.

The chute may be moved to front-feed position by operating a handle 135 upon the right carriage end. This handle 135 in being operated releases the feed rolls 33, 34 at the underside of the platen 31, it being understood that to facilitate front-feed of a sheet the feed rolls 33, 34 are withdrawn below the paper apron 117, see Figure 6. The said handle 135 is fastened to and rises, at the outside of the right carriage end, from a short shaft 136 extending through and journaled in the right carriage end 28 and has close to the inner wall of the carriage end an operating element 137. Below the shaft 136 the operating element 137 has connected thereto a link 139 which at its lower end is connected to a gear sector 138 pivotally carried upon the adjacent carriage end. The gear sector 138 is in mesh with another gear sector 140 fixedly carried on a feed-roll release-shaft 141 extending from one to the other end of the carriage and pivotally carried thereon. The feed-roll releaseshaft 141 is capable to act upon the feed-roll supporting-fixtures 35 to release the feed rolls. For this purpose the feed-roll release-shaft 141 is flat at opposite sides at spaced intervals along the shaft, and the feed-roll fixtures have headed fingers 145 reaching upwardly and toward the shaft. In the normal position of the feed rolls, that is, when the feed rolls bear against the platen, as in Figure 1, the shaft 141 is in such rotative position that the flats on the shaft are directly facing but are just clear of the headed fingers. When the handle 135 is operated to the position seen in Figure 6, the shaft 141 is turned about 90° to spread said headed fingers 145 and release the feed rolls against the tension of the springs 39. For operating the chute 108 the operating element 137 is formed with a cam face 142 which during actuation of the handle 135 will act upon a pin 143 fast on and laterally projecting from the downward reach 133 of the adjacent arm 127. Said cam face 142 imparts to said pin 143 the required rearward motion to cause the bail 127, 128 to move the chute 108 to front-feed position. This occurs during an initial part actuation of the operating handle 135, while during completing handle actuation the pin 143 and, therefore, also the chute is detained in operated position by a dwell-continuation 144 of the cam face 142, see Figure 6. It is here to be understood that the handle 135 and the operating element 137, upon operation, have no tendency to return, inasmuch as the springs 39 associated with the feed-roll fixtures are then incapable to exert any turning influence on the cam shaft 141. In the forward position of the chute, see Figures 5 and 9, the lower panel edges 119 are at such elevation that if the top of the last-written line on a front-inserted sheet is brought to register with said edges 119, see particularly Figure 9, such sheet will then be a predetermined distance above the last-typing position, ready for receiving the next line entry. Said predetermined distance preferably corresponds to a single line space. To render said bottom edges 119 easily visible they may be coated or lined in a clearly visible color, as by colored collodion.

After a work sheet has been front-inserted down the chute into proper position, the handle 135 is returned rearwardly to the normal position seen in Figures 1 and 3. This will first cast on the said bottom feed rolls 33, 34, to hold the inserted sheet to the platen and will subsequently cause the chute to return to normal position under the urge of the return springs 132, when the pin 143 leaves the dwell 144 and is permitted to slide along the cam face 142 to reassume normal position. It may be noted at this point that in the normal position of the handle 135, the pin 143 is in or nearly in contact with the cam face 142 and that the handle 135 has a stop ear engageable with the end piece 28 of the carriage for limiting its rearward throw.

Power conditioning of front-feed device

Figure 4:
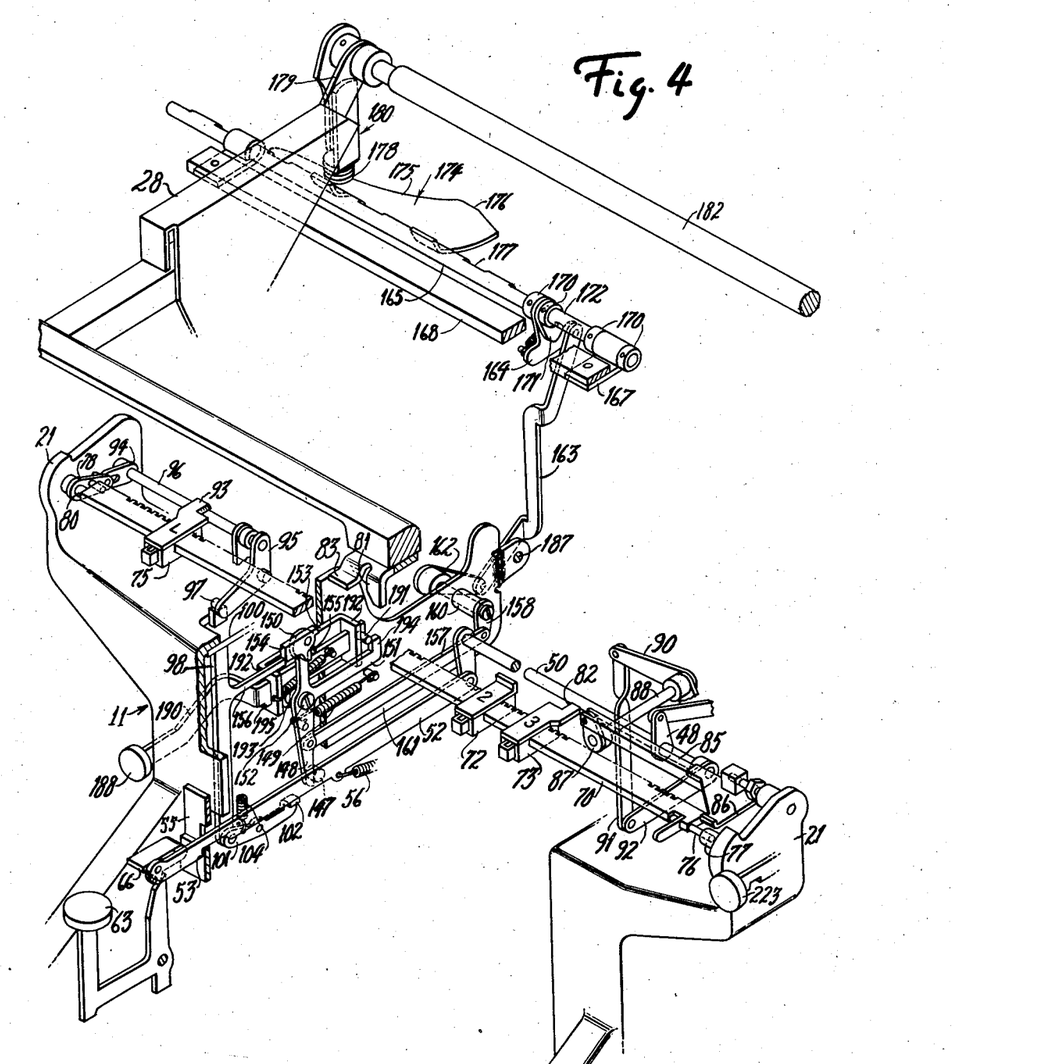
Figure 4 is a skeleton perspective view illustrating some major parts of a carriage return controlling device diclosed in the patent to H. L. Pitman No. 2,306,564, dated December 29, 1942, together with a front-feed device adapted for operation thereby.

It is desired to condition the front-feed device for front feeding a statement sheet whenever the carriage is power returned under control of a particular one of several control agencies, which according to the preferred embodiment of the invention, is whenever the carriage is returned as a result of its advance to a specific position. As has been made clear hereinbefore an automatic carriage return is instituted when the tongue 81 on the carriage encounters the cam face 93 of the line-end margin-stop 75. It will be remembered that the resulting downward depression of the margin stop 75 by the ear 81 causes the carriage return trip link 52 to be lifted by the underlying ear 102, and that this action results in a rearward actuation of the trip link 52 to closed clutch position. Provision is made so that whenever the link 52 is tripped under control of the line-end margin-stop 75, see Figure 6, there will ensue, preferably during the beginning of the carriage return, automatically, a forward movement of the chute 108 to front-feed position. Referring particularly to Figures 1 and 4, it will be seen that the trip link 52 carries a laterally extending pin 147 and that extending downwardly in front of this pin there is a pivoted arm 148 constituting part of a three armed lever, also including an upwardly reaching arm 150 and a rearwardly reaching arm 151. Said lever is pivoted at 152 upon a bracket 153 and the arm 150 has pivoted thereon a forwardly extending dog 154 which rests by gravity against a pin 155 and which has capacity for some upward pivotal movement. Blocking normally said dog 154 against forward movement is an arm 156 branching rearwardly from the member 93 of the automatic tripping train leading from the margin stop 75 to the trip link 52. If a carriage return is called into operation by the agency of any of the several carriage return keys 61, 62, 63 the trip link 52 will move rearwardly and the lever arm 148 tends to follow under the tension of the spring 149, but such movement is suppressed since the arm 156 stands in obstructing relation to the dog 154. However, if a carriage return is instituted through the agency of the line-end margin stop 75, the arm 156 descends clear of the dog 154, with the result that upon rearward movement of the trip link 52 the three armed lever will become actuated under the tension of the spring 149, the dog 154 moving freely over the arm 156. The motion of the three armed lever is transmitted over a rearwardly extending link 157 to an arm 158 which is fast on a short shaft 160 pivoted in and extending laterally through a side panel 161, from the interior to the exterior of the machine. Outside of the panel 161 the shaft 160 has another arm 162 attached thereto which arm, by means of a link 163, is connected to an arm 164 pivotally carried on a rock shaft 165. Said shaft extends lengthwise of the carriage 10 and is pivotally supported by bracket plates 167 which are fastened to a transverse bar 168 secured upon the rear standards 20 of the main frame work 11 of the machine. Collars 170 at opposite sides of one of the brackets 167 locate the shaft 165 endwise. Adjacent the loose arm 164, fast on the shaft is an arm 171 having a lug 172 held yieldingly in contact with the adjacent loose arm 164 by a spring 173. Also fixed on the shaft 165 is a cam plate 174 having a cam edge 175 biased rearwardly in a rightward direction and ending in a short dwell 176. The cam plate 174 is securable by screws to the shaft 165 in various locations therealong as required for different work, and for this purpose the shaft has broad flat-faced notches 177, and screw holes, at equally spaced intervals. The normal rotative position of the cam plate 174 is as illustrated in Figure 1, and a circumferentially grooved follower-roller 178 carried at the lower end of a rearwardly swingable, carriage-supported arm 180, will be unaffected by the cam 174 during all carriage travel, except when a carriage return is instituted automatically by agency of the line-end margin-stop 75. In the latter case, the operation of the control mechanism leading to the cam 174 will rock the latter into position for engagement in the roller groove and for rearward displacement of the roller 178 during the ensuing automatic return movement of the carriage. The resultant rocking motion imparted to the roller carrying or follower arm 180 is transmitted to the aforedescribed operating handle 135 to move the front-feed chute to front-feed position. The arm 180 consists preferably of two parts, as seen in Figures 1 and 4, to facilitate adjustment of the roller supporting part, vertically and angularly. The composite arm 180 is fast on a rock shaft 182, which extends lengthwise of the carriage, from the left end to the right end behind a rear paper shelf 183, and which is fulcrumed in spaced brackets 179 fast on and rising from the opposite ends of the carriage. At its right end there is secured to the shaft 182, an arm 184 to which there is connected a forwardly extending link 185, having at its forward end a slot 186 whereinto there extends a headed stud on a descending arm of the operating handle 135. Thus, whenever the roller carrying arm 180 is operated by the cam 174, the operating handle 135 is automatically actuated through the link 185, as seen in Figure 6, it being understood that as a result the chute 108 is moved to front-feed position and the bottom feed rolls 33, 34 become released. Incidentally, Figure 6 shows the mechanism leading from the line-end margin-stop 75 to the levering tab 102 actuated, but in reality this mechanism returns to normal position at the very beginning of the return, before the illustrated displacement of the roller-carrying arm 180 takes place. The dog 154, having assumed a position over the arm 156, as in Figure 6, will, as a result of the return of said mechanism, be raised idly about its pivot. The slot 186 in the link 185 permits actuation of the operating handle 135 independently of the link 185 and the associated parts leading to the roller 178, and also allows the restoration of said link and associated parts to normal position while the chute remains in forward position.

The bracket 153 on which the three armed lever 148, 150, 151 is pivoted, is riveted to the inner side of the panel 161 which provides a closure for an open side of the main frame 10. Said panel is secured to the side of the frame by means of screws 187.

Incapacitation of power conditioning mechanism

It may be desired at times in doing certain classes of work, to incapacitate the described power mechanism against conditioning the front feed mechanism. For this reason there is in the proximity of the keyboard a key 188 comprising a slide 190 which carries near its rearward end a laterally projecting pin 191. The key slide is guided in slots provided in horizontally bent-off ears 192 of the bracket 153 and the pin 191 normally engages the rear of one of said ears by reason of the slide being normally held in forward position by a spring 193. The arm 151 of the three armed lever has at its rear extremity a protuberance 194 which is normally free to rise behind the pin 191. In the event it is desired to incapacitate the automatic front-feed conditioning mechanism, the key or manual control 188 is pressed rearwardly and downwardly until a shoulder 195 catches behind the front ear 192. In this rearwardly set position of the key or control 188 the pin 191 directly overlies the protuberance 194 so that the three armed lever will then be incapable to move the cam into cooperative relation with the associated roller 178. The key slide 190 has an outward bend through a cut-out 196 in the panel 161 and extends around the left side of the frame forwardly to the keyboard.

*Sheet deflecting and aligning plate, record sheet holding mechanism*

Figure 5:
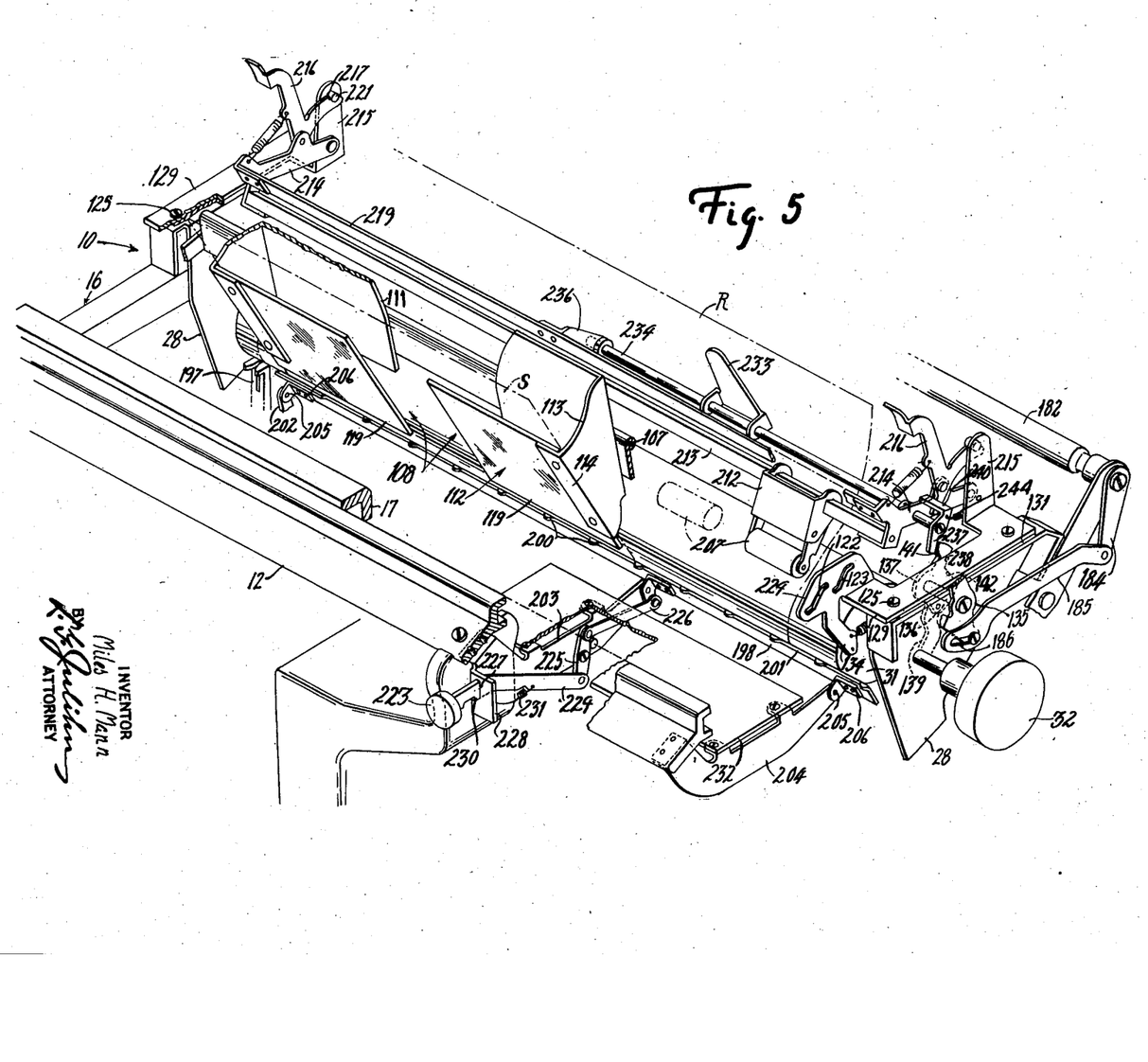
Figure 5 is a skeletonized perspective illustration similar to Figure 3, but shows the front-feed mechanism operated or conditioned for front-insertion of a statement sheet, the carriage being shown moved to the extreme rightward limit on its supporting frame which is indicated in part.
Figure 6:
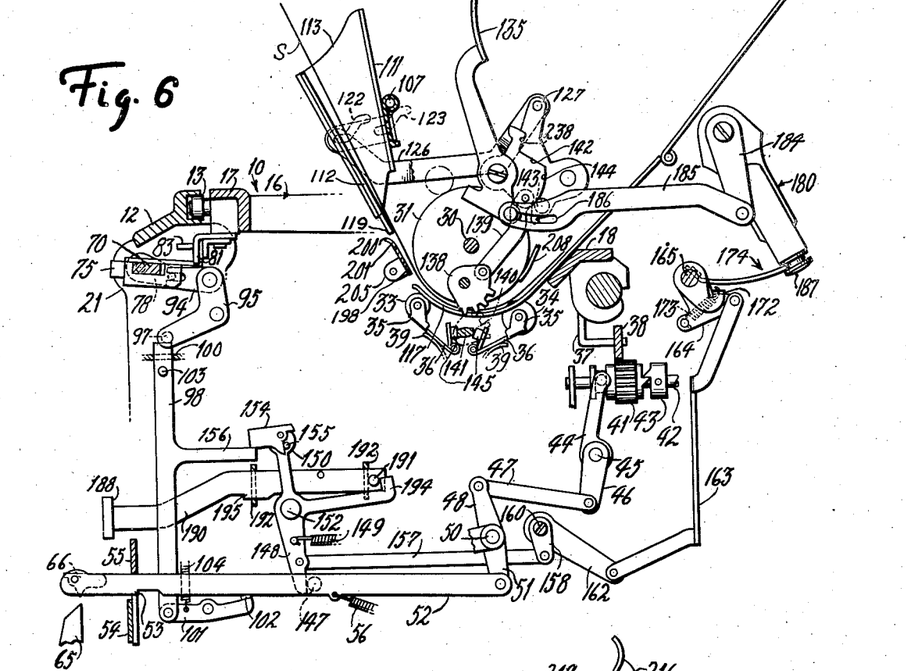
Figure 6 is a diagrammatic side view which depicts the front-feed mechanism as having been operated for statement sheet insertion by a carriage return operation that has been automatically called into operation.

In Figure 5 the carriage is in fully returned position and the conventional type guide 197, immediately above which the types 19 are adapted to print, is in front of the left end of the platen and to the left side of the chute 108. It is in this position of the carriage that the record sheet and the statement sheet are usually presented to the machine. The type guide 197 is very close to the front of the platen and makes it infeasible to flare out or extend the paper apron 117 very far from the platen. To supplement or assist the chute in its function to guide the statement sheets into the space between the platen 31 and the paper apron 117, there is provided to the right of the type guide and the operating path of the types 19, extending parallel to the platen, a normally rearwardly and downwardly inclined deflector plate 198. The plate 198 is preferably substantially equal in length to the carriage and is carried upon the main frame of the machine. For purposes to be brought out later, the plate 198 is serrated to form alternate high and low edge sections 200 and 201, respectively. Also for purposes yet to be described, the plate 198 is hingedly mounted at 205 upon spaced brackets 202, 203, and 204, on an axis slightly below the platen axis and slightly in front of the platen, the plate 198 having pivoting members 206 riveted thereto. The bracket 202 which is to the right of the type guide 197 rises from a part of the main frame, not shown, and the other two brackets 203, 204 are secured to the frame by means of screws to the underside of the front rail 12.

The statement sheets "S" are usually presented down the chute 108 after a record sheet "S" has already been presented to the machine and is held directly upon the platen, by means of a row of auxiliary feed rolls 207 bearing on top of the platen, and by means of a row of spring fingers 208 bearing against the rear of the platen. The spring fingers are only indicated in the side views of the drawings, but there are a row of them carried upon a square tube 210 which is pivotally carried upon the bail rod 128. A spring 211 connected to an arm 109 on the square tube, presses the spring fingers towards the platen. See Figures 1 and 3. Each auxiliary feed roll 207 is supported upon a fixture 212, of which there is one shown in Figure 5, but of which there is a row arranged at spaced intervals upon a square rod 213 extending along the full length of the carriage. The square rod 213 constitutes part of a pivoted bail which also includes two bail arms 214 hingedly carried upon risers 215 on opposite brackets 129. A brace bar 219 fixed at opposite ends to the bail arms 214 lends greater rigidity to the bail 213, 214. Normally the bail is held in the position seen in Figures 1 and 5, by means of two latch levers 216, one associated with each bail arm 214, and having each a shoulder 217 for latching engagement with a pin 221 on the associate riser 215. By exerting rearward pressure against said latch levers 216 the bail can be moved to the raised position seen in Figure 7, wherein a notch 222 on the lever is effective to yieldingly retain the bail.

Figure 7:
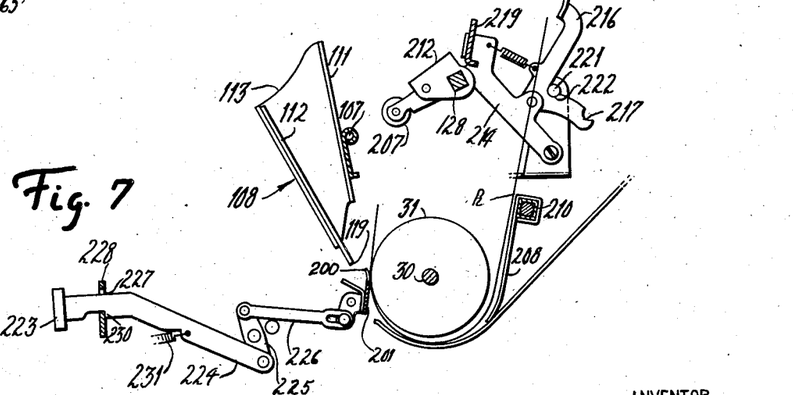
Figure 7 is a diagrammatic side elevation showing the front-feed device in a special condition for rear-inserting a record sheet.

The record sheet "R" is inserted from the rear and in preparation thereto the chute 108 is moved to the forward position, see Figure 7, the deflector plate 198 is tilted rearwardly to the position seen in Figure 7. Concomitantly with inserting the record sheet "R" the supporting rod 210 for the finger 208 is given, by means not shown, a slight swinging motion to release the fingers from the platen. The introduced sheet glides around the platen over the paper apron 117 and is then deflected by the plate 198, to direct the sheet upwardly and rearwardly behind the chute 108. When the sheet has been properly positioned with reference to the last line of writing thereon, the spring fingers are allowed again to bear towards the platen, and the top feed rolls 207 are cast on.

To operate the deflector plate 198 from the normal position of Figures 1, 5, 6, and 9, there is provided a key 223 upon a push link 224, which, by means of a motion reversing lever 225, pivoted on bracket 203, is connected to a pull-link 226. The link 224 is guided near its forward end in a perforation 227 of a flange 228 of the bracket 203, and has a shoulder 230 adapted to latch behind said flange when the link is pushed to the rear. A spring 231 tends to restore the push link 224 to normal position and also tends to pull the link downwardly for the purpose of latching it in rearward position. A cover plate 232, fastened as shown upon the brackets 203, 204 may be provided.

Figure 8:
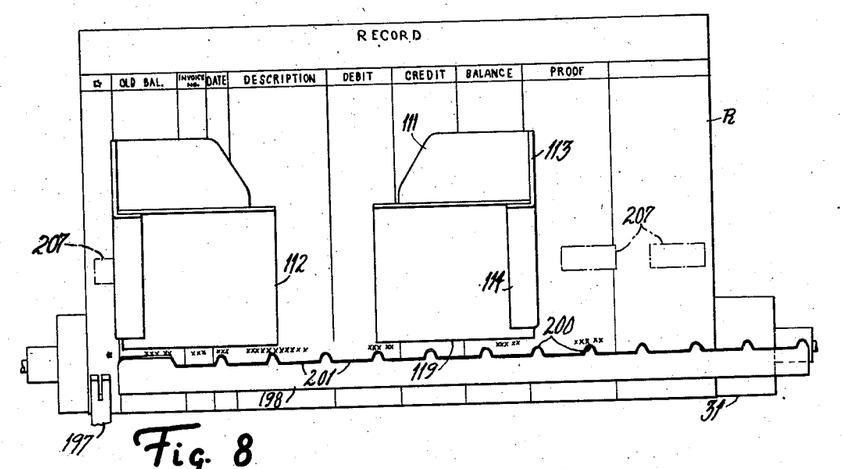
Figure 8 is a schematic front view of certain parts of the front-feed devices positioned as in Figure 7, thereby to facilitate rear-insertion and positioning of a record sheet for receiving a next line-entry.

Figure 8 shows a record sheet as having been rear-inserted and properly positioned for typing the next line-entry. The crosses upon the record sheet indicate the last line typed thereon and it will be perceived from Figure 8 that the record sheet has been so positioned that the bottom of the last-typed line is in registration with the high edge sections 200 of the deflector plate 198. When the record sheet is so positioned and the top feed rolls then cast on, the record sheet will be in proper position for typing the next line-entry thereon, it being understood that the high edge sections 200 are spaced above the bottom of the writing line a distance equal to a single line space, but may, if desired, be spaced a greater distance thereabove. The depressed edge sections 201 are provided so that by reference thereto a previously typed line may be positioned at the typing line for a corrective or supplemental entry.

*Auxiliary restoring control for front feed device*

After insertion of a record sheet and a statement sheet, preparatory to typing, it is desired to restore the chute 108 to the normal position, wherein the bottom edges 119 thereof will press the statement sheets snugly around the front side of the platen. For effecting this conveniently, there is provided a finger piece 233 in close proximity to the right end of the chute 108. Said finger piece 233 is splinedly carried upon a rock shaft 234 and can be shifted readily therealong to whatever position it is most conveniently accessible to the operator. The shaft 234 reaches from the right carriage end at least one half the length of the carriage leftwardly and is pivoted thereat in a bracket 236 which is fixed upon the rear of the brace 219 on the auxiliary feed-roll bail. At the right, the shaft 234 is pivoted in and extends outwardly from the bail arm 214 and has thereat a pendant arm 237 fixed thereto. When the front-feed mechanism has been operated as in Figure 5, an arm 238, integral with the operating element 137, will be situated directly behind the arm 237. If then the finger piece 233 is tipped forwardly by the operator, the operating element 137 will receive sufficient return motion for the pin 143 to act under the tension of the springs 132 upon the cam face 142, and thereby to complete the restoration. The normal position of the shaft 234 is established under the influence of a spring 244, by a stop ear 240 that is integral with the arm 237 and adapted for engagement upon the adjacent bail arm 214. Obviously, if desired, the front-feed mechanism may also be restored to normal condition by returning the operating handle 135 rearwardly.

Figure 9:
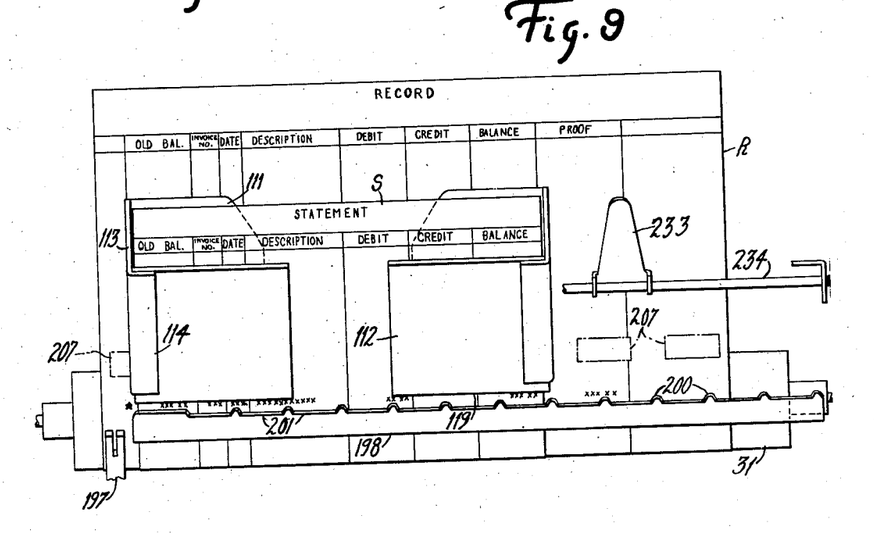
Figure 9 is a schematic view similar to Figure 8 with the front-feed device in condition for front-feeding and properly locating a statement sheet in the position for the next line-entry.

By way of example, the statement sheet "S" shown in Figure 9 has the following writing columns: Old Balance, Invoice No., Date, Description, Debit, Credit, and Balance. The record sheet "R" has additionally a star printing column and a Proof Balance column, the former to the left and the latter to the right of the statement sheet. Typing in the Proof Balance column is to be succeeded almost always by removal of the statement sheet "S" and introduction of a new statement sheet. Taking advantage of this condition, the aforedescribed line-end margin-stop 75 is set along its supporting rack to institute an automatic power return of the carriage as the latter escapes after conclusion of the entry in the Proof Balance column. Assuming the key 188 to be set, as in Figures 1 and 4, such automatic carriage return will be accompanied by a conditioning operation of the front-feed device. Preferably the front-feed operating cam 174 is fastened at such location along its supporting shaft 165 that the front-feed device will become operated or conditioned shortly after the automatic carriage return has commenced. This avails the operator the opportunity to remove the statement sheet "S" at the earliest possible moment, while the carriage is still returning, and allows getting set for introduction of a new statement sheet. The extreme return stop 73 is preferably set to terminate the return after the statement sheet has past to the left of the type guide 197, see Figure 9. It is then that a new statement sheet is front-fed down the chute and properly positioned by matching the top of the last-written line thereon with the bottom edges 119 of the chute panels 112. The new statement sheet having been positioned, the finger piece 233 is given a forward flip by the same hand by which the sheet was introduced. As a result, the front-feed device becomes restored to normal position and the bottom feed-rolls 33, 34 become cast on. Typing of the newly inserted statement sheet can then commence, a star being first typed in the star printing column, in proof of a clear register.

If the transaction to be recorded calls for a single line-entry, the last amount typed will be in the Proof Balance column and will be followed automatically by a return of the carriage and a front-feed conditioning operation. However, when there are several transactions under the same date, that is when there are several successive line-entries to be made without removal of the sheet, the only entry necessary for the Proof Balance column is in the last one of the successive lines. In all the other lines the carriage is never further advanced than the Credit column so that automatic carriage return and front-feed conditioning will be avoided with respect to these lines. To return the carriage and line space the work sheets to the successive lines, one of the several return keys 61, 62, 63 may be employed to locate the carriage for commencement of typing in appropriate columns to the right of the star printing column.

While only one embodiment of the invention has been shown and described, many variations may be resorted to within the scope of the invention, and portions of improvements may be used without others.

What is claimed is:

1. In a machine having a carriage advanceable and returnable on a frame, and having a device on the carriage requiring movement to an operated position to facilitate paper manipulation, a member on the carriage, a member on the frame operable by the first said member through advance movement of the carriage to a specific position, a power operable mechanism engageable for returning the carriage, means conditionable to cause operation of said device incidental to return travel of the carriage, and means to engage said power operable mechanism and to condition said conditionable means responsive to operation of said second member by said first member.

2. In a machine of the class described, having a carriage advanceable and returnable on a frame, and having a device on the carriage requiring movement to an operated position to facilitate paper manipulation, the combination with normally ineffective power return means for the carriage, of manually operable control means to effectuate said power return means, means to effectuate said return means automatically in response to an advance of the carriage to a certain position, means conditionable to cause operation of said device incidental to return travel of the carriage, and means to condition said last means incidental to advance movement of the carriage to the said position, wherefor said device facilitates paper manipulation in consequence of only such returns of the carriage which are instituted automatically.

3. In a machine having a carriage advanceable and returnable on a frame, and having a device on the carriage requiring movement to an operated position to facilitate paper manipulation, the combination with a power operable mechanism engageable for returning the carriage, of means conditionable to cause operation of said device incidental to carriage-return travel, means movable from and to a normal position respectively to engage and disengage said mechanism, means to hold normally said movable means in normal position, means urging said movable means from said normal position, means to release said holding means and thereby cause engagement of said mechanism, said releasing means including a plurality of carriage return control means, and means responsive to at least one of said control means, to condition said conditionable means to cause the operation of said device incidental to the return travel of the carriage which ensues the engagement of said mechanism.

4. In a machine of the class described, having a carriage advanceable and returnable on a frame, a releasable feed-roll mechanism, a front-feed device on the carriage requiring movement to an operated position to render it serviceable for front feeding sheets, means at the right end of the carriage, operable to release said feed-roll mechanism and to operate said device, and power means to operate said operable means, comprising, a power mechanism for returning the carriage, and means to operate said operable means by return travel of the carriage, said operating means comprising a rock shaft carried on and extending lengthwise of the carriage, means operatively connecting said rock shaft with said operable means at the right end of the carriage, a cam on the frame, and a follower arm on said rock shaft adapted for operation by said cam, said follower arm being a distance equal to at least one half the length of the carriage to the left of the right end of the carriage.

5. In a machine of the class described, a long work-sheet supporting carriage, a front-feed chute on the carriage being of much lesser width than the length of the carriage, and having at least one lateral end remote from the carriage end to the same side, said chute requiring movement to an operated position to be serviceable, a normally applied work-sheet holding mechanism, means on one end of the carriage operable to move said chute to operated position and to release said work-sheet holding mechanism, and restorable to apply first the work-sheet holding mechanism and then to restore said chute, means including spring means capable of restoring said operable means upon the latter being first partially restored, and means to effect at least a partial restoration of said operable means, including, a finger piece proximate said remote lateral end of the chute, and an operative connection between said finger piece and said chute moving means.

6. In a machine of the class described, a long work-sheet supporting carriage, a chute on the carriage for front-feeding relatively narrow work sheets to the machine, said chute being of much lesser width than the length of the carriage, being remote to at least one end of the carriage and requiring movement to an operated position to render it serviceable for front feeding, means to operate said chute, a provision at said one end of the carriage to detain said chute upon operation, and means operable to cause restoration of said chute, including, a rock shaft located to the rear of the chute and extending lengthwise of the carriage from said one end of the carriage to at least the proximity of said chute, and a finger piece on the rock shaft near one end of the chute for operating said shaft.

7. In a machine of the class described, a long work-sheet supporting carriage, a platen roller on said carriage, a series of top feed rolls, means including a bail, supporting said top feed rolls so that they normally bear against the top of the platen, said bail being substantially co-extensive with the platen and swingable from the platen, a front-feed device on the carriage requiring movement to an operated position to be serviceable, means to move said device to front-feed position, and means to cause restoration of said device to normal position, including operable means carried on said bail for swinging movement therewith, said operable means comprising a shaft rockably supported on said bail and a finger piece adjustably securable along the shaft in different positions.

8. In a front strike typewriting machine having a carriage movable on a frame, a platen roller on said carriage, a paper apron curving around the underside of the platen and affording a space between it and the platen, at the front of the platen and below a typing line, for introduction of work sheets, frame-supported typing instrumentalities operable to type on said platen, an elongate deflector plate extending parallel to the platen and located to one side of the operating path of said typing instrumentalities, said plate being substantially co-extensive with the carriage when the latter is moved to one side on the frame, and being normally sloping downwardly to the rear to guide front-fed work sheets into said space, means on the carriage to front-feed work sheets downwardly over said plate into said space, and means to tilt said plate rearwardly towards said platen to guide rear-inserted work sheets upwardly and rearwardly behind said front-feed means after they emerge from said space.

9. In a front strike typewriting machine having a carriage movable on a frame, a platen roller on said carriage, a paper apron curving around the underside of the platen and affording a space between it and the platen, at the front of the platen and below a typing line, for introduction of work sheets, frame-supported typing instrumentalities operable to type on said platen, an elongate deflector plate extending parallel to the platen and located to one side of the operating path of said typing instrumentalities, said plate being substantially co-extensive with the carriage when the latter is moved to one side on the frame, and being normally sloping downwardly to the rear to guide front-fed work sheets into said space, and means to tilt said plate rearwardly towards said platen, said plate having an upper edge which in the rearwardly tilted position of said plate is at such level that if the last line of writing of a rear-inserted sheet is brought to view directly above it, such rear-inserted sheet will be in proper position for the next line of typing.

10. In a front strike typewriting machine having a carriage movable on a frame, a platen roller on said carriage, a paper apron curving around the underside of the platen and affording a narrow space between it and the platen, at the front of the platen and below a typing line, for introduction of work sheets, frame-supported typing instrumentalities operable to type on said platen, an elongate deflector plate extending parallel to the platen and located to one side of the operating path of said typing instrumentalities, said plate being substantially co-extensive with the carriage when the latter is moved to one side on the frame and being normally sloped downwardly to the rear to guide front-fed work sheets into said space, and means to give said plate rearward tilt towards said platen, to guide rear-inserted work sheets upwardly and rearwardly after they emerge from said narrow space, said plate having a serrated edge affording, in the rearwardly tilted position of the plate, alternate low and high edge sections by selective reference to which a previously typed line on a work sheet may be positioned either at the typing line or a predetermined distance thereabove.

11. In a front strike typewriting machine having a carriage movable on a frame, a platen roller on said carriage, frame-supported typing instrumentalities operable to type on said platen, an elongate plate extending parallel to the platen and located to one side of the operating path of said typing instrumentalities, means for supporting said plate in an inclined position towards the front of the platen, said plate having a serrated edge affording alternate low and high edge sections by selective reference to which a previously typed line on a work sheet may be positioned either at the typing line or a predetermined distance thereabove.

12. In a front strike typewriting machine having a carriage movable on a frame, a platen roller on said carriage, a paper apron curving around the underside of the platen and affording a narrow space between it and the platen, at the front of the latter and below a typing line, for introduction of work sheets, frame-supported typing instrumentalities operable to type on said platen, an elongate deflector plate extending parallel to the platen and located to one side of the operating path of said typing instrumentalities, said plate being normally sloping downwardly to the rear to guide front-fed work sheets into said space, means to mount said plate for movement to a rearwardly tilted position wherein to guide rear-inserted work sheets upwardly and rearwardly past the front of the platen after they emerge from said narrow space, and means including, a manual control proximate the keyboard of the machine, to give said plate either said normal or said rearwardly titled position.

13. In a machine having a carriage advanceable and returnable on a frame, and having a device on the carriage requiring movement to an operated position to facilitate paper manipulation, power means, means comprising, a part on the frame, a part on the carriage, one of said parts operable by the other incidental to the advance of the carriage to a certain position to render said power means effective to return said carriage, a carriage return key, means responsive to said key to render said power means effective to return the carriage, and means to cause an operation of said device by said power means consequental to each operation of said other part, but never consequential to the operation of said key.

14. In a machine having a carriage advanceable and returnable on a frame, and having a device on the carriage requiring movement to an operated position to facilitate paper manipulation, a member on the frame operable by the carriage as the carriage advances to a specific position, power means, a mechanism, conditionable to cause said power means to power-return the carriage, and also conditionable to cause said power means to power-return the carriage and to power-actuate said device, means to condition said mechanism in direct response to operation of said member, to cause said power-means to power-return the carriage, and additionally to cause power-actuation of said device, a carriage return key, and means to condition said conditionable mechanism in response to the operation of said key only in respect to causing said power means to power-return the carriage.

15. In a machine having a carriage advanceable and returnable on a frame, and having a device on the carriage requiring movement to an operated position to facilitate paper manpulation, a member on the frame operable by the carriage as the carriage advances to a specific position, power means, a mechanism, conditionable to cause said power means to power-return the carriage, and also conditionable to cause said power means to power-return the carriage and to power-actuate said device, means to condition said mechanism in direct response to operation of said member, to cause said power-means to power-return the carriage and additionally to cause power-actuation of said device, a carriage return key, means to condition said conditionable mechanism in response to the operation of said key only in respect to causing said power means to power-return the carriage, and presettable means to render said mechanism conditionable in response to the operation of said member only in respect to causing said power means to power-return the carriage.

16. In a machine having a carriage advanceable and returnable on a frame, and having a device on the carriage requiring movement to an operated position to facilitate paper manipulation, a power-operable mechanism engageable for returning the carriage, means conditioning to cause operation of said device incidental to return travel of the carriage, means to engage said power-operable mechanism, and means controlled by a part of said engaging means to condition said conditionable means and thereby cause operation of said device incidental to the return of the carriage.

17. In a machine having a carriage advanceable and returnable on a frame, and having a device on the carriage requiring movement to an operated position to facilitate paper manipulation, a power-operable mechanism engageable for returning the carriage, means conditionable to cause operation of said device incidental to return travel of the carriage, means to engage said power-operable mechanism in response to the advance of the carriage to a certain position, and means normally controlled by a part of said engaging means to condition said conditionable means in response to advance of the carriage to said certain position, and presettable means to operatively divorce the conditionable means from control of said part.

18. In a machine having a carriage advanceable and returnable on a frame, and having a device on the carriage requiring movement to an operated position to facilitate paper manipulation, a power-operable mechanism engageable for returning the carriage, means conditionable to cause operation of said device incidental to return travel of the carriage, and means to engage said power-operable mechanism and to condition said conditionable means directly responsive to the advance of the carriage to a certain position, said engaging and conditioning means comprising a part on the carriage, and a part on the frame, one of said parts operable by the other part in response to the advance of the carriage to said certain position to cause conditioning of said conditionable means.

19. In a machine having a carriage advanceable and returnable on a frame, and having a device on the carriage requiring movement to an operated position to facilitate paper manipulation, normally ineffective power return means for the carriage, a carriage return key, means comprising a part on the frame, a part on the carriage, one of said parts operable by the other incidental to the advance of the carriage to a certain position to render said power return means effective, means responsive to said key to render said power return means effective, a camming member on the frame, a companion camming member on the carriage operable by the first said member and operatively connected to operate said device, said camming members being relatively moveable into and out of cooperative relation respectively for operation and non-operation of said companion camming member by the first said camming member during carriage returns, and means to control the relation of said camming members so that they are cooperative during such carriage returns as are instituted by operation of said operable part, but never during such carriage returns as are instituted by operation of said key.

20. In a machine having a carriage advanceable and returnable on a frame, and having a device on the carriage requiring movement to an operated position to facilitate paper manipulation, a member on the frame operable by the carriage as the carriage advances to a specific position, power means, a mechanism, conditionable to cause said power means to power-return the carriage, and also conditionable to cause said power means to power-return the carriage and to power-actuate said device, means to condition said mechanism in direct response to operation of said member, to cause said power-means to power-return the carriage and additionally to cause power-actuation of said device, and presettable means to render said mechanism conditionable in response to the operation of said member only in respect to causing said power means to power-return the carriage.

MILES H. MANN.